Sept. 8, 1942.  J. HEMMINGS  2,295,111
MANUFACTURE OF TUBULAR VALVE MEMBERS
Filed July 10, 1941

John Hemmings
By Watson, Cole, Grindle
Watson
ATTYS

Patented Sept. 8, 1942

2,295,111

UNITED STATES PATENT OFFICE 2,295,111

MANUFACTURE OF TUBULAR VALVE MEMBERS

John Hemmings, London, England, assignor to S. Smith & Sons (Motor Accessories) Limited, Cricklewood, London, England, a British company Application July 10, 1941, Serial No. 401,851
In Great Britain January 2, 1940

2 Claims. (Cl. 29—157.1)

This invention relates to the manufacture of valves or the like having a body member incorporating a cylindrical bore in which a piston member can slide and one or more ports or recesses opening into the bore. The invention is particularly applicable to valves used for controlling pneumatic or hydraulic servomotors and in the construction of such valves the ports or recesses may not be easily formed and difficulty especially arises in removing burrs from the sides of the ports or recesses. The chief object of the invention is to overcome this disadvantage.

According to the present invention the method of constructing a valve body or like member having a cylindrical bore and one or more ports or recesses opening into the bore comprises the step of separating the member into a plurality of parts to expose the interior of the bore along its length for easy access to the parts of the bore in which the ports or recesses are formed. In this manner any burrs on the sides of the ports or recesses may be easily removed. Preferably, the parts are separable along a plane parallel to or containing the lengthwise axis of the bore.

According to a further feature of the invention the one or more ports or recesses are formed while the parts of the member are separated one from another. In this manner the cutting of the ports or recesses is simplified.

A further feature of the invention consists in first forming a plurality of part blanks with mating surfaces, securing the part blanks together and forming the bore in the assembled blanks.

Another feature of the invention consists in that the body member is formed with pairs of annular recesses spaced apart lengthwise of the bore and interconnected to form a single port whereby the intermediate part of the bore between each pair of recesses constitutes a support for the co-operating piston member.

The invention includes a cylindrical body member constructed in accordance with the aforesaid method and preferably comprising dowels or the like for accurately locating the parts of the member relatively to one another.

One application of the invention to the manufacture of a control valve for an air-operated servomotor of an automatic pilot for aircraft will now be described by way of example with reference to the accompanying drawing, in which.

Figure 1:
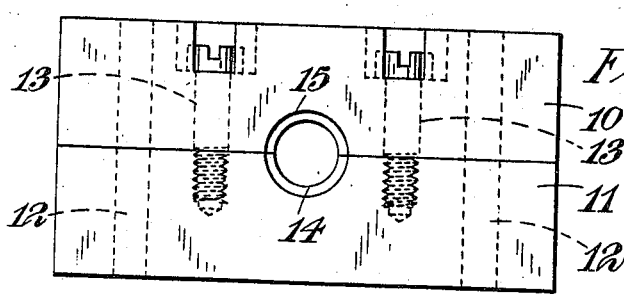
Figure 1 is an elevation of two assembled part blanks of the body member with the cylindrical bore formed therein.
Figure 2:
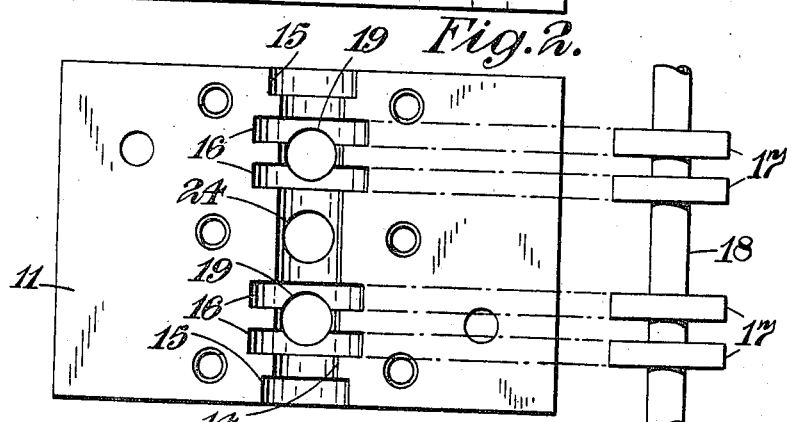
Figure 2 is a plan of one of the part blanks with the ports formed therein.
Figure 3:
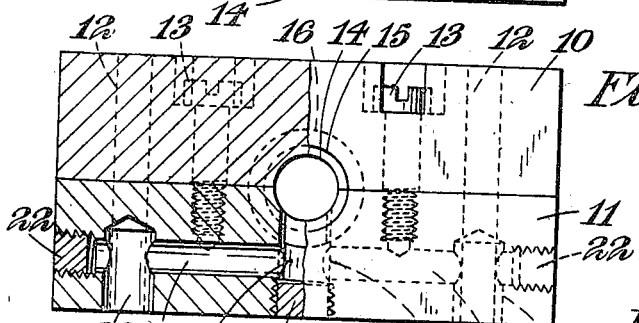
Figure 3 is an elevation partly in section of the completed and assembled body member, the section being taken on the line 3—3 of Figure 4.
Figure 4:
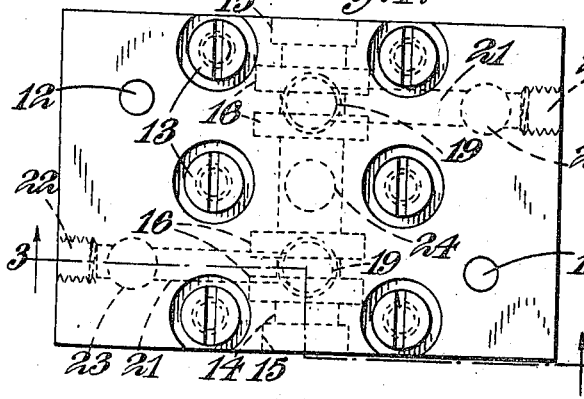
Figure 4 is a plan of the assembled body member.

Referring to the drawing, the body member is formed of two part blanks 10 and 11 placed face to face and having their abutting surfaces polished flat so that the two parts mate closely together with the surfaces in contact. The two parts are located with respect to one another by means of dowel pins 12 and are secured together by bolts 13. After the two part blanks have been secured together a cylindrical bore 14 is formed in them so as to be divided axially at the plane of the mated surfaces of the two part blanks. In this case the bore is formed with an enlarged part 15 at each end.

The two parts are then separated so as to expose the inner wall of the bore in the two parts. The ports are in the form of pairs of annular recesses 16 and are readily cut in each of the two parts by means of a rotary cutting tool comprising milling cutters 17 mounted on a shaft 18 and spaced apart according to the required port spacing. Any burrs produced by the cutting of the ports may also be easily removed because the ports are readily accessible with the parts separated. While the parts are still separated the part 11 is drilled to provide the necessary ducts. For each pair of port recesses 16 there is a duct 19 formed by a bore closed at the outer side of the body member by means of a plug 20. This duct communicates with a cross bore 21 closed at the side of the valve member by plug 22 and communicating with another bore 23 open to the under side of the body member. Another bore 24 leads from the under side of the body member to the interior thereof between the two pairs of port recesses 16.

Figure 5:
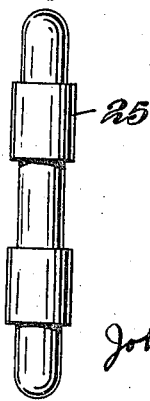
Figure 5 is a plan of a co-operating piston member.

Finally, the two parts are again bolted together and accurately located by the dowel pins and the assembly is then ready for use with a co-operating piston member shown at 25 in Figure 5 slidable in the bore 14. Sliding movement of the piston member 25 in the bore of the body member controls in the usual manner the port openings constituted by the pairs of recesses 16. By employing a pair of annular recesses spaced lengthwise of the bore to form a port there is retained an intermediate part of the bore constituting a bearing surface for the co-operating piston member.

I claim:

1. The method of constructing a valve body having a cylindrical bore in which a piston can slide and a port opening into the bore, which method comprises forming a plurality of part blanks with mating surfaces, assembling said part blanks together with the mating surfaces in contact, forming the bore in said part blanks when assembled such that the bore is divided lengthwise by the junction of said mating surfaces, separating the part blanks and forming the said port in at least one of the part blanks while separated one from another.

2. The method of fabricating a valve body of the type having a cylindrical bore to receive a closely fitting reciprocable piston and a plurality of longitudinally spaced annular ports encircling the bore and in open communication therewith, said method comprising forming two valve body parts with mating surfaces, which parts, when assembled with mating surfaces in contact, together constitute that portion of the valve body in which the bore and ports are to be formed, assembling said parts with mating surfaces in contact, cutting away adjacent portions of both parts while maintaining them so assembled to form a cylindrical bore portion of which is in one part and the remainder in the other part, the said bore being longitudinally divided by the junction of said mating surfaces, separating said parts, forming the annular ports in complementary sections by cutting grooves in the wall portions of the divided bore, and reassembling the parts with mating surfaces in contact and the respective walls of the bore and ports continuous.

JOHN HEMMINGS.